US012499255B2

United States Patent
Peng et al.

(10) Patent No.: US 12,499,255 B2
(45) Date of Patent: Dec. 16, 2025

(54) ADAPTIVE PRIVACY BUDGETING AND ADAPTIVE SAMPLING VALUE PREDICTION

(71) Applicant: Google LLC, Mountain View, CA (US)

(72) Inventors: Jiayu Peng, Sunnyvale, CA (US); Michael James Wurm, Morristown, NJ (US); Chenwei Wang, Mountain View, CA (US); Pasin Manurangsi, Bangkok (TH); Adam Benjamin Gelernter Sealfon, New York, NY (US); Jakub Tětek, Mountain View, CA (US); Matthew Tran Clegg, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 108 days.

(21) Appl. No.: 18/502,816

(22) Filed: Nov. 6, 2023

(65) Prior Publication Data
US 2025/0005179 A1    Jan. 2, 2025

Related U.S. Application Data

(60) Provisional application No. 63/511,462, filed on Jun. 30, 2023.

(51) Int. Cl.
*H04L 29/06* (2006.01)
*G06F 21/62* (2013.01)
(52) U.S. Cl.
CPC .................................. *G06F 21/62* (2013.01)

(58) Field of Classification Search
CPC ........................................................ G06F 21/62
See application file for complete search history.

(56) References Cited

U.S. PATENT DOCUMENTS

| 11,170,131 | B1 | 11/2021 | Rogers et al. |
| 2007/0192221 | A1 | 8/2007 | Sandor et al. |
| 2011/0208763 | A1* | 8/2011 | McSherry ............. G06F 16/901 707/757 |
| 2019/0080116 | A1 | 3/2019 | Kenthapadi et al. |
| 2021/0359836 | A1 | 11/2021 | Wright et al. |
| 2021/0360010 | A1* | 11/2021 | Zaccak ................... G06N 20/20 |
| 2023/0351036 | A1* | 11/2023 | Gilmore ................ G06F 16/256 |
| 2025/0078083 | A1* | 3/2025 | Arora .................. G06Q 20/4016 |

OTHER PUBLICATIONS

International Search Report and Written Opinion for Application No. PCT/US2024/016362, mailed Jun. 14, 2024, 11 pages.
GitHub, "World-federation-of-advertisers/Cross-media-measurement", https://github.com/world-federation-of-advertisers/cross-media-measurement, retrieved on Nov. 7, 2023, 6 pages.

* cited by examiner

*Primary Examiner* — Jason K Gee
(74) *Attorney, Agent, or Firm* — DORITY & MANNING P.A.

(57) ABSTRACT

Systems and methods for generating and maintaining differential privacy while providing accurate values can include obtaining a plurality of noise-added values, processing the plurality of noise-added values to determine a predicted value. The plurality of noise-added value may be utilized to determine one or more accuracy values that can be compared to a threshold to determine if more data is to be obtained and processed before providing a predicted value.

20 Claims, 9 Drawing Sheets

ADAPTIVE PRIVACY BUDGETING AND ADAPTIVE SAMPLING VALUE PREDICTION

RELATED APPLICATIONS

The present application is based on and claims priority to U.S. Provisional Application No. 63/511,462 having a filing date of Jun. 30, 2023. Applicant claims priority to and the benefit of each of such application and incorporate all such application herein by reference in its entirety.

FIELD

The present disclosure relates generally to determining and providing a value estimation that is within a threshold accuracy while maintaining differential privacy. More particularly, the present disclosure relates to adding noise to a value of interest to provide differential privacy for the involved parties and then determining an estimation value based on the processing of multiple rounds of noisy values.

BACKGROUND

User reach and/or user interactions may be tracked to obtain statistics on the breadth of the reach, context of the reach (e.g., when, who, what, where, and/or why), and/or the breadth or context of the interaction. However, the count estimation may impact privacy. For example, the true number of the count estimate may not abstract out underlining details of the user group. Count estimations can be associated with views and/or inputs (e.g., selections, text inputs, image inputs, audio inputs, etc.).

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for value estimation. The method can include obtaining, by a computing system including one or more processors, a first noisy dataset. The first noisy dataset can be descriptive of a first value. The first value can be generated by adding a first noise value to a ground truth value. In some implementations, the first noise value can include a random number value within a noise range. The method can include obtaining, by the computing system, at least one second noisy dataset. The at least one second noisy dataset can be descriptive of at least one second value. For each of the at least one second value, a respective second value can be generated by adding a respective second noise value to the ground truth value. The method can include processing, by the computing system, the first value and the at least one second value to determine a predicted value and a standard deviation of noise-added values. The standard deviation can be based on the predicted value, the first value, and the at least one second value. The method can include determining, by the computing system, the standard deviation is below a threshold value. In response to determining the standard deviation is below the threshold value, the method can include providing, by the computing system, the predicted value as an output.

In some implementations, the noise range for the random number value of the first noise value may differ from the one or more respective noise ranges for the at least one respective second noise value. The threshold value can be determined based at least in part on an order of magnitude of the predicted value. The method can include obtaining, by the computing system, a value request from a user computing system. The value request can be descriptive of a query to obtain an estimate of the ground truth value. In some implementations, the first noisy dataset can be obtained based on the value request. The method can include generating, by the computing system, a report for the user computing system. The report can include the predicted value. The method can include transmitting, by the computing system, the report to the user computing system.

In some implementations, the at least one second noisy dataset can include a plurality of second noisy datasets. The at least one second value can include a plurality of second values. In some implementations, the method can include varying the noise range for each instance of noise data generation such that the first noise value is randomly selected from a first value range and a plurality of respective second noise values randomly selected from a plurality of respective second value ranges. The predicted value can be determined based on weighting the first value and the plurality of second values based on respective noise ranges. Weighting can be inversely scaled based on a noise range size. In some implementations, the ground truth value can be descriptive of an amount of views of a media content item. The ground truth value can be descriptive of at least one of an amount of interactions with a user interface element, an amount of unique viewers for a content item, an amount of clicks of a link, or an amount of conversions.

Another example aspect of the present disclosure is directed to a computing system. The system can include one or more processors and one or more non-transitory computer-readable media that collectively store instructions that, when executed by the one or more processors, cause the computing system to perform operations. The operations can include obtaining a first noisy dataset. The first noisy dataset can be descriptive of a first value. The first value can be generated by adding a first noise value to a ground truth value. In some implementations, the first noise value can include a random number value within a noise range. The operations can include obtaining a second noisy dataset. The second noisy dataset can be descriptive of a second value. The second value can be generated by adding a respective second noise value to the ground truth value. The operations can include processing the first value and the second value to determine a first predicted value and a first standard deviation. The first standard deviation can be based on the first predicted value, the first value, and the second value. The operations can include determining the standard deviation is above a threshold value and obtaining an additional noisy dataset. In some implementations, the additional noisy dataset can be descriptive of an additional value. The additional value can be generated by adding a respective additional noise value to the ground truth value. The operations can include processing the first value, the second value, and the additional value to determine a second predicted value and a second standard deviation. The second standard deviation can be based on the second predicted value, the first value, the second value, and the additional value. The operations can include determining the second standard deviation is above the threshold value and in response to determining the second standard deviation is below the threshold value, providing the second predicted value as an output.

In some implementations, the noise range can be determined based on a Gaussian distribution. The first noise value obfuscates the ground truth value. The first noisy dataset can be generated by sampling a population of data. In some implementations, the ground truth value can be descriptive of a count for a first sampled subpopulation. The predicted value can be determined by weighting the first value based on a sampling rate. The sampling rate can be descriptive of a size for the first sampled subpopulation. In some implementations, the threshold value can be determined based at least in part on an inverse cumulative distribution function. The inverse cumulative distribution function can be dependent on a requested confidence level.

Another example aspect of the present disclosure is directed to one or more non-transitory computer-readable media that collectively store instructions that, when executed by one or more computing devices, cause the one or more computing devices to perform operations. The operations can include obtaining a first noisy dataset. The first noisy dataset can be descriptive of a first value and a first noise range. The first value can be generated by adding a first noise value to a ground truth value. The first noise value can include a random number value within the first noise range. The operations can include obtaining a plurality of second noisy datasets. The plurality of second noisy datasets can be descriptive of a plurality of second values and a plurality of respective second noise ranges. For each of the plurality of second values, a respective second value can be generated by adding a respective second noise value to the ground truth value. In some implementations, the respective second noise value can include a random number value within a respective second noise range of the plurality of respective second noise ranges. The operations can include processing the first value and the plurality of second values to determine a predicted value and a standard deviation of noise-added values. The standard deviation can be based on the predicted value, the first value, and the plurality of second values. The operations can include determining the standard deviation is below a threshold value and in response to determining the standard deviation is below the threshold value, providing the predicted value as an output.

In some implementations, the ground truth value can be determined and stored on a server computing system. The first noise value and the plurality of respective second noise values may have been determined and applied by the server computing system. The first noisy dataset and the plurality of second noisy datasets can be obtained from the server computing system. In some implementations, a user computing system can determine the predicted value and the standard deviation, and the server computing system and the user computing system may differ.

Another example aspect of the present disclosure is directed to a computer-implemented method for value estimation. The method can include obtaining, by a computing system including one or more processors, a first noisy dataset. The first noisy dataset can be descriptive of a first value. In some implementations, the first value can be generated by adding a first noise value to a first ground truth value. The first noise value can include a random number value within a noise range. The first ground truth value may be determined by sampling a first portion of a reach dataset. The reach dataset can be descriptive user views associated with a media content item. The method can include obtaining, by the computing system, a plurality of second noisy datasets. The plurality of second noisy datasets can be descriptive of a plurality of second values. For each of the plurality of second values, a respective second value can be generated by adding a respective second noise value to a respective second ground truth value. In some implementations, each of the respective second ground truth values can be determined by sampling a respective second portion of the reach dataset. The method can include processing, by the computing system, the first value and the plurality of second values to determine a predicted value and a standard deviation of noise-added values. The standard deviation can be based on the predicted value, the first value, and the plurality of second values. The method can include determining, by the computing system, the standard deviation is below a threshold value. The method can include providing, by the computing system, the predicted value as an output in response to determining the standard deviation is below the threshold value.

In some implementations, the first ground truth value can be determined by sampling at a first sampling rate. The first sampling rate can be associated with a size of a first sampled dataset. The respective second ground truth value can be determined by sampling at a second sampling rate. The second sampling rate can be associated with a size of a second sampled dataset. In some implementations, the first sampling rate and the second sampling rate can be different. The predicted value can be determined based on weighting the first value and the plurality of second values based on respective sampling rates for each respective ground truth value. The noise range can be constant for the first value and the plurality of second values.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
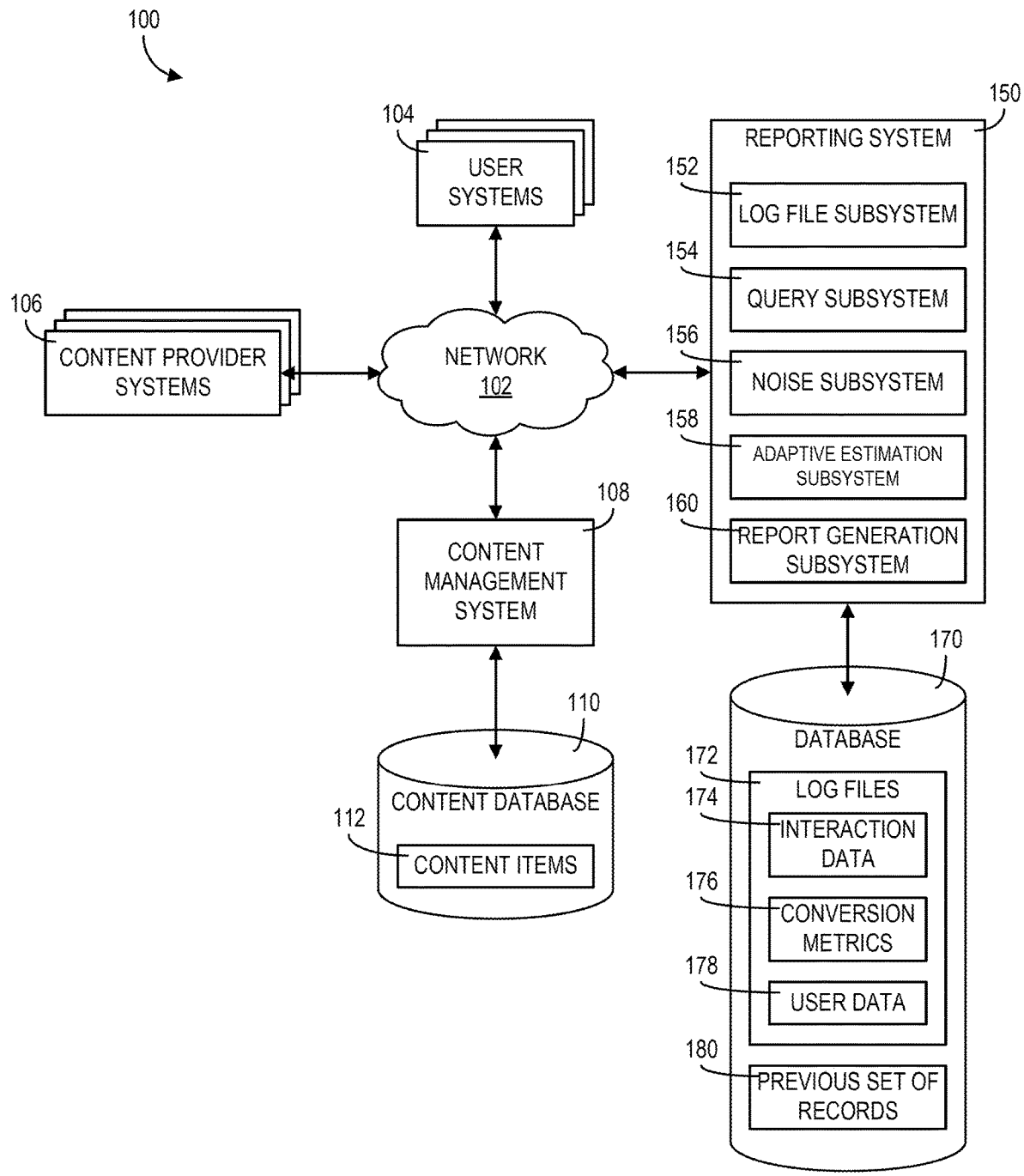
FIG. 1 depicts a block diagram of an example computing system that performs adaptive value prediction according to example embodiments of the present disclosure.

Reference numerals that are repeated across plural figures are intended to identify the same features in various implementations.

DETAILED DESCRIPTION

Overview

Generally, the present disclosure is directed to systems and methods for predicting values based on noise-added datasets. In particular, the systems and methods disclosed herein can leverage the obtainment of a plurality of noise-added datasets to generate a predicted value within a threshold accuracy. The systems and methods can receive a request for a ground truth value (e.g., a real value for a quantification of interactions with a content item (e.g., a website, an image, a video, an article, etc.)). The ground truth value can be processed with a noise engine that outputs a noisy dataset. The noise engine can determine a noise variable to utilize to add noise to the ground truth value. The noise variable can be based on a quantifiable magnitude of the ground truth value and may be selected from a range of variables that are associated with the quantifiable magnitude of the ground truth value. The process of obtaining a noisy dataset may be repeated in a plurality of iterations to obtain a plurality of noisy datasets associated with the ground truth value. The plurality of noisy datasets can be processed to determine a predicted value, which may include an estimate based on the plurality of noisy values, one or more determined noisy ranges, and/or a number of iterations. Additionally and/or alternatively, a deviation (e.g., a standard deviation) may be determined based on the plurality of noisy datasets. The deviation can then be utilized to determine whether the predicted value is provided in response to the request or if additional noisy datasets are to be obtained and processed.

The systems and methods may obtain and process data associated with the interaction statistics for an entire population of data. Alternatively and/or additionally, the population of data may be sampled such that a portion of the entire population of data is utilized for generating and processing noisy datasets. In some implementations, the sampling rate may be utilized to determine the predicted value and/or deviation.

The ground truth values can be associated with collected real world data for interactions and/or may be associated with data gleaned (or obtained) from one or more sensors, one or more processing engines, and/or one or more databases. The ground truth value may be descriptive of a number of views, selections, saves, edits, and/or deletions for a given content item. The data can be obtained via web cookies, web traffic statistics, application programming interface use, eye tracking, metadata, etc. In some implementations, the noise ranges, the sampling rates, and/or the target criterion may vary depending on the field and the type of data.

Privacy can be a concern when collecting and aggregating data. In particular, in the digital age of content item display (e.g., web images, web articles, web videos, advertisements, etc.), data involving interactions can be helpful in understanding the reach of the content item, which may include determining how and to what extent the content item is received. Data regarding views, selections, deletions, saves, and/or non-action can provide content providers with data that can enable the content provider to adjust content item generation and/or content item presentation (e.g., how the content item is provided, where the content item is provided, when the content item is provided, who the content item is provided to, etc.). Interaction data may be collected in order to capture these useful datapoints; however, the raw datapoints may lack differential privacy. Therefore, the datasets may not be suitable for sharing until obfuscated. Intermediary parties including intermediary web platform providers may desire to provide third party content providers with data associated with their content item being displayed without infringing on the privacy of the users that are performing the interactions.

The systems and methods disclosed herein can be utilized to generate and provide predicted value that maintains differential privacy for the users while being within a target accuracy parameter from the ground truth value. The systems and methods can obtain and/or generate noisy datasets that include noise added to the ground truth value. The noise can be within a noise range and may be added to the ground truth value via value addition, value multiplication, value subtraction, value multiplication, value concatenation, and/or one or more other noise adding techniques. The systems and methods can iteratively request the value in order to obtain a plurality of noisy datasets for the ground truth value. The plurality of noisy datasets can be processed to determine a predicted value and a deviation for the plurality of noisy datasets. If the predicted value and/or the deviation meet a stopping criterion, the predicted value may be provided as an output.

For example, the systems and methods can include obtaining a first noisy dataset. The first noisy dataset can be descriptive of a first value. In some implementations, the first value can be generated by adding a first noise value to a ground truth value. The first noise value can include a random number value within a noise range (e.g., a first noise range). The ground truth value can be descriptive of an amount of views of a media content item. In some implementations, the ground truth value can be descriptive of an amount of interactions with a user interface element. The noise range can be determined based on a Gaussian distribution. The first noise value may obfuscate the ground truth value.

The systems and methods can include obtaining a plurality of second noisy datasets. The plurality of second noisy datasets can be descriptive of a plurality of second values. For each of the plurality of second values, a respective second value can be generated by adding a respective second noise value to the ground truth value. In some implementations, the respective second noise value can include a random number value within a respective second noise range of the plurality of respective second noise ranges. The noise range for the random number value of the first noise value may differ from the one or more respective noise ranges for the plurality of respective second noise values.

Alternatively and/or additionally, the systems and methods may obtain a second noisy dataset individually and/or with a plurality of other second noisy datasets. The second noisy dataset can be descriptive of a second value. The second value can be generated by adding a respective second noise value to the ground truth value. In some implementations, the ground truth value can be determined and stored on a server computing system. The first noise value and the plurality of respective second noise values may be determined and applied by the server computing system. In some implementations, the first noisy dataset and the plurality of second noisy datasets can be obtained from the server computing system.

The first value and the plurality of second values can be processed to determine a predicted value and a standard deviation associated with the predicted value and/or the noisy values. The standard deviation can be based on the predicted value, the first value, and the plurality of second values. The predicted value may be determined by weighting the first value and a plurality of second values based on their corresponding noise ranges.

The first noisy dataset can be generated by sampling a population of data. In some implementations, the ground truth value can be descriptive of a count for a first sampled subpopulation. The predicted value can be determined by weighting the first value and/or the plurality of second values based on their corresponding sampling rates. The sampling rate can be descriptive of a size for the first sampled subpopulation. A user computing system may be utilized to determine the predicted value and the standard deviation. The server computing system and the user computing system may differ.

In some implementations, the first value and the second value can be processed to determine a first predicted value and a first standard deviation. The first standard deviation can be based on the first predicted value, the first value, and the second value. The systems and methods can then determine the first standard deviation is above a threshold value. Based on the first standard deviation being above a threshold, the systems and methods can obtain an additional noisy dataset. The additional noisy dataset can be descriptive of an additional value. In some implementations, the additional value can be generated by adding a respective additional noise value to the ground truth value.

The systems and methods may then determine the standard deviation is below a threshold value. For example, the second standard deviation may be determined to be above the threshold value. The threshold value can be determined based at least in part on an order of magnitude of the predicted value. In some implementations, the threshold value can be determined based at least in part on an inverse cumulative distribution function. The inverse cumulative distribution function can be dependent on a requested confidence level.

The systems and methods can include providing the predicted value as an output in response to determining the standard deviation is below the threshold value (e.g., providing the second predicted value as an output). The predicted value can be provided via a graphical user interface (e.g., a report interface, an interactions pane, a notification, etc.), an email, a text message, and/or a file transfer. The predicted value may be provided with graphical depictions of the data (e.g., timelines, charts, graphs, etc.).

In some implementations, the systems and methods can include obtaining a value request from a user computing system (e.g., a content provider computing system). The value request can be descriptive of a query to obtain an estimate of the ground truth value. The first noisy dataset can be obtained based on the value request.

Additionally and/or alternatively, the systems and methods may include generating a report for the user computing system (e.g., the content provider computing system). The report may include the predicted value, and the report may be transmitted to the user computing system.

In some implementations, the noise range can vary for each instance of noise data generation such that the first noise value is randomly selected from a first value range, and a plurality of respective second noise values may be randomly selected from a plurality of respective second value ranges. The predicted value can be determined based on weighting the first value and the plurality of second values based on respective noise ranges. The weighting can be inversely scaled based on a noise range size.

The systems and methods of the present disclosure provide a number of technical effects and benefits. As one example, the system and methods can be utilized to leverage noise generation, multiple value obtainment, and a stop coefficient to determine a predicted value for a requested count that is within a target accurate threshold while maintaining differential privacy. In particular, the systems and methods disclosed herein can obfuscate collected data, while still providing a content provider with relatively accuracy interaction data. The systems and methods can be utilized for advertisement statistics, anonymous electronic polls, social media, etc.

Another example technical effect and benefit relates to improved computational efficiency and improvements in the functioning of a computing system. For example, a technical benefit of the systems and methods of the present disclosure is the ability to reduce the computational resources needed for determining an accurate predicted value from noise-added samples. In particular, the systems and methods disclosed herein can be iteratively utilized one or more thresholds to determine when a target accuracy is obtained, which can be utilized to determine when to stop obtaining noise-added datasets.

With reference now to the Figures, example embodiments of the present disclosure will be discussed in further detail.

Example Devices and Systems

FIG. 1 depicts a block diagram of a reporting system 150 and associated environment 100 is shown according to an illustrative implementation. One or more user computing systems 104 may be used by a user to perform various actions and/or access various types of content, some of which may be provided over a network 102 (e.g., the Internet, LAN, WAN, etc.). For example, user computing systems 104 may be used to access webpages (e.g., using an Internet browser), media files, and/or any other types of content. A content management system 108 may be configured to select content for display to users within resources (e.g., webpages, applications, etc.) and to provide content items 112 from a content database 110 to user computing systems 104 over network 102 for display within the resources. The content items from which content management system 108 selects may be provided by one or more content providers via network 102 using one or more content provider computing systems 106. In some implementations, content management system 108 may select one or more content items from one or more content providers among a plurality of content items from a plurality of content providers. In such implementations, content management system 108 may determine content to be published in one or more content interfaces of resources (e.g., webpages, applications, etc.) shown on user computing systems 104 based at least in part on metrics or other characteristics of the content items or content providers.

A reporting system 150 may be configured to receive data associated with one or more resources of a content provider. In some implementations, the data is interaction data. The interaction data indicates user interactions with a resource and/or content within the resource (e.g., interactions relating to a content item presented on a resource). The interactions can include selections, views, saves, deletions, etc. Reporting system 150 may use the interaction data to generate data related to the user interactions. The data may include, for example, a number of clicks or impressions on a content item, a cost for the content provider associated with displaying the content items, a number of conversion events executed by a user in response to viewing a content item, etc. Reporting system 150 may generate a set of records based on the interaction data. In some implementations, the reporting system may generate a set of records in response to a query request submitted by a content provider computing system 106. The set of records can be an aggregated collection of data relating to interactions with one or more content items. The data may be aggregated based on user interaction data identified based on one or more parameters of the query.

Additionally and/or alternatively, FIG. 1 depicts user computing systems 104 and/or content provider computing systems 106 that may include any type of computing system (e.g., a desktop computing device, a mobile computing device, a server computing system, a user computing system, and/or another computing device having one or more processors and memory or other type of computer-readable storage medium), which may include a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user computing systems 104 may be set-top boxes or other devices for use with a television set. In some implementations, content may be provided via a web-based application and/or an application resident on a user computing system 104. In some implementations, user computing systems 104 and/or content provider computing systems 106 may be designed to use various types of software and/or operating systems. In various illustrative implementations, user computing systems 104 and/or content provider computing systems 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User computing systems 104 and/or content provider computing systems 106 may be configured to receive data from various sources using a network 102. In some implementations, network 102 may include a computing network (e.g., LAN, WAN, Internet, etc.) to which user computing systems 104 and/or content provider computing system 106 may be connected via any type of network connection (e.g., wired, such as Ethernet, phone line, power line, etc., or wireless, such as WiFi, WiMAX, 3G, 4G, 5G, LTE, satellite, etc.). In some implementations, network 102 may include a media distribution network, such as cable (e.g., coaxial metal cable), satellite, fiber optic, etc., configured to distribute media programming and/or data content.

Content management system 108 may be configured to select third-party content items to be presented on a resource. For example, content management system 108 may conduct an auction or bidding process. One or more content items of one or more winners of the auction or bidding process can be selected for display on the resource. Content management system 108 may further use a quality score (i.e., a measure of how likely a user of user computing system 104 is to interact with the content item or take a conversion action related to the content item) or other metric during the process of selection of the content item. Content providers, in some implementations, may create a content campaign, or may otherwise provide various settings or guidelines to content management system 108. Such settings or guidelines may govern how the content provider participates in the auction or bidding process (e.g., how much to bid in a given auction, a total budget (weekly, daily, or otherwise) for the content provider, etc.). Such settings or guidelines may be set based on various metrics, such as a cost per impression or cost per thousand impressions (CPM), a cost per click (CPC), or a cost per acquisition (CPA) or cost per conversion. Such settings or guidelines may further be set based on the type of platform on which a content item should be provided (e.g., mobile, desktop, etc.), what type of resource on which a content item should be provided (e.g., a search results page), a geographic location of the user computing system displaying the resource, and the like.

As described above, reporting system 150 is configured to generate a report for a content provider in response to a query from a content provider. The query may be submitted to reporting system 150 via a content provider computing system 106, or may be a scheduled query (e.g., the content provider wishes to run a particular query on a consistent basis). Reporting system 150 is shown to include a log file subsystem 152 configured to receive interaction data for a plurality of content items and resources. Log file subsystem 152 may then generate one or more log files 172 including interaction data for the content items and store the log files in database 170.

Log files 172 may include interaction data 174 and conversion metrics 176 for a plurality of interactions and conversion events relating to one or more content items displayed on a resource. For example, an interaction or conversion event may include a user viewing a content item on a resource, clicking, and/or otherwise interacting with the content item, completing a purchase on the resource relating to the content item, watching a particular video or viewing a particular image, clicking on a link, or any other action that may be desired by the content provider providing the content item. Interaction data 174 may include data such as a date/time or timestamp on which the action occurred, a platform (e.g., browser) used to complete the action, and the like. Log files 172 may further include user data 178, which may include an anonymous identifier for the user differentiating the user from other users, for example. Log files 172 may be stored in any format within database 170 (e.g., table, spreadsheet, text file, etc.). For example, log files 172 may be generated for a given time frame (e.g., a log file for interaction data generated in a given time period) or based on any other metric.

Query subsystem 154 may receive a query or request from a content provider (e.g., via content provider computing system 106) and/or from a user (e.g., from a user computing system 104), or may automatically generate a query for a content provider based on a schedule or other preferences specified by the content provider. Query subsystem 154 may receive the query and parse the query to identify one or more parameters. The parameters may include one or more content items relating to the query (i.e., one or more specific content items for which the content provider wants a report generated). The parameters may further include one or more resources or platforms (e.g., specific webpages on which the content item was displayed, specific types of user computing systems, etc.). The parameters may further include characteristics such as a geographic location, demographics, user registration characteristics (i.e., if the user has an account with the content provider), and the like. The parameters may further include one or more dates and/or times, indicating that the content provider wishes to view interactions in a given time frame. After identifying the one or more parameters, log file subsystem 152 may identify a set of log file records in database 170 that may include interaction data relevant to the one or more parameters. Log file subsystem 152 may then generate a current set of records from log files 172, identifying relevant interaction data 174. The current set of records may be aggregated data from log files 172 based on the identified parameters. The current set of records may be associated with a ground truth value associated with a reach and/or a quantity of interaction with one or more media content items.

A noise system 156 may receive a set of records identified via log file subsystem 152 and add noise to a ground truth value (e.g., add noise to a view count and/or add noise to an overall interaction value). For example, noise subsystem 156 may identify the content provider submitting a query to retrieve interaction information (e.g., count value information) associated with one or more media content items (e.g., one or more advertisement campaigns), and may retrieve one or more set of records generated for the content provider. The noise subsystem 156 may then determine a noise value based on a determined noise range. The noise range may be selected by the reporting system, may be deterministic, may be preset, may be selected by the content provider, and/or may be machine-learned. In some implementations, the noise range may be a plus-minus range associated with a variance percentage of the total value of the ground truth value (e.g., 1-2% of the value of the real count for the interaction data). Additionally and/or alternatively, the noise range may be associated with a Gaussian distribution. The noise value may be a randomly selected value within the noise range. The noise value may be selected by a random number generator that processes the noise range to randomly select a number within the plus-minus range. The noise subsystem 156 can then add the noise value to the ground truth value (e.g., add noise to the set of records) to generate a value that can be provided to the content provider. The noise value may not be disclosed to the content provider in order to provide differential privacy associated with the set of records.

Adaptive estimation subsystem 158 may be configured to process a plurality of noisy datasets associated with a plurality of noise-added values to generate an estimated value with a threshold accuracy, while continuing to maintain differential privacy of the users that interacted with content item associated with the respective set of records. Additionally and/or alternatively, the adaptive estimation subsystem 158 may facilitate the obtainment, generation, and processing of additional noisy datasets until a threshold standard deviation value is met. In some implementations, the set of records may be sampled at one or more sampling rates to generate one or more sampled values descriptive of one or more subsets of the interaction data. The one or more sampled values may be obfuscated by adding noise then processed to determine an estimated value for the whole interaction dataset. The adaptive estimation subsystem 158 may facilitate the obtainment, generation, and processing of additional sample values and/or additional noisy sampled datasets. The report generation subsystem 160 may generate a report based on the outputs of the noise subsystem 156 and/or the adaptive estimation subsystem 158. The report may be descriptive of the one or more noise-added values, the one or more estimated values, and/or the one or more determined accuracy values.

Figure 9:
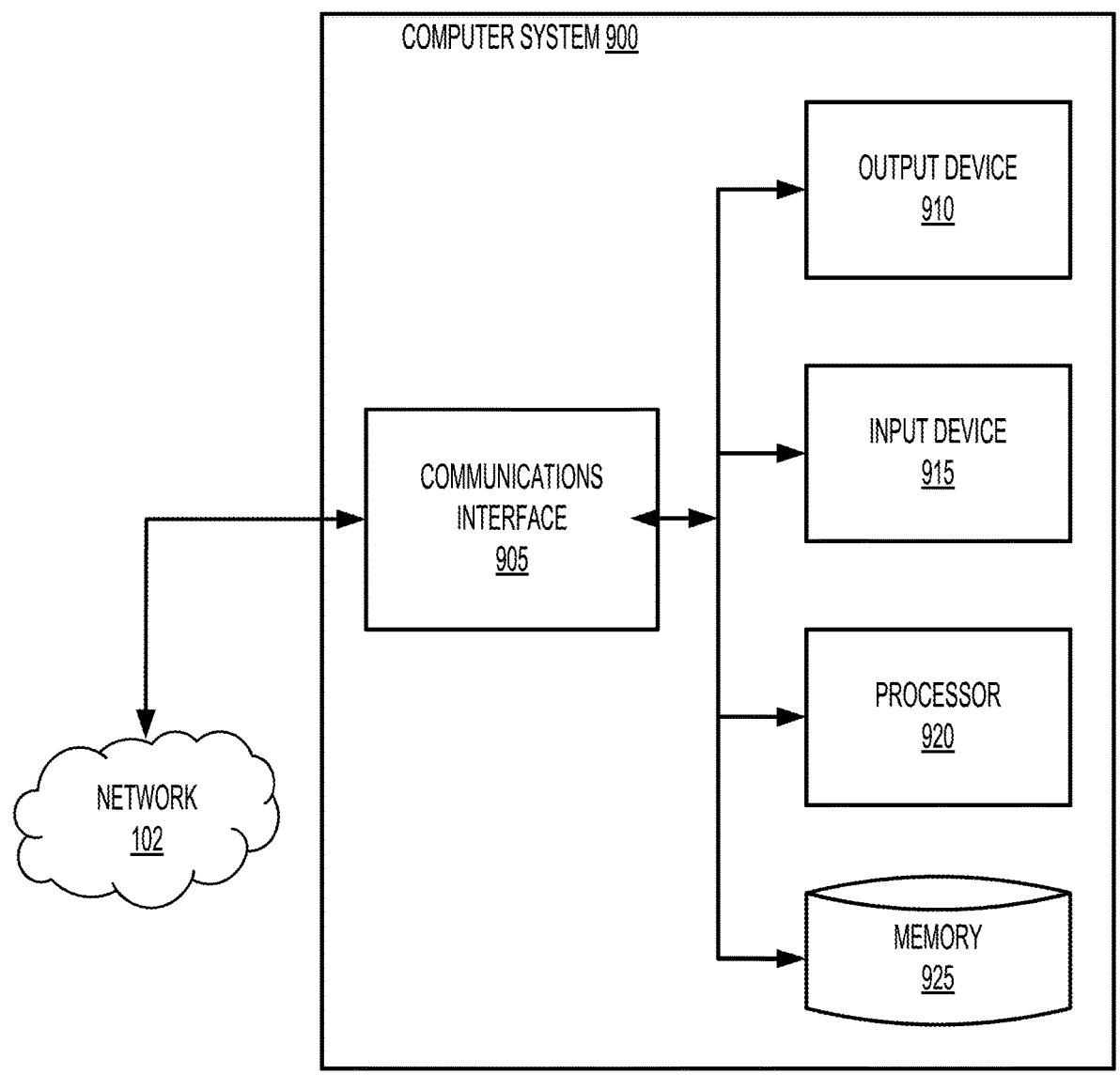
FIG. 9 depicts a block diagram of an example computing system that performs adaptive value prediction according to example embodiments of the present disclosure.

FIG. 9 can depict a general architecture of an illustrative computer system 900 that may be employed to implement any of the computer systems discussed herein in accordance with some implementations. The computer system 900 can be used to provide information via the network 102 for display. The computer system 900 of FIG. 9 can include one or more processors 920 communicatively coupled to memory 925, one or more communications interfaces 905, and one or more output devices 910 (e.g., one or more display units) and one or more input devices 915. The processors 920 can be included in any of the computing devices described herein.

In the computer system 900 of FIG. 9, the memory 925 may comprise any computer-readable storage media and may store computer instructions such as processor-executable instructions for implementing the various functionalities described herein for respective systems, as well as any data relating thereto, generated thereby, or received via the communications interface(s) or input device(s) (if present). Referring again to the system 900 of FIG. 9, the computer system 900 can include the memory 925 to store any of the information, variables, vectors, data structures, or other computer-readable information described herein, among others. The processor(s) 920 shown in FIG. 9 may be used to execute instructions stored in the memory 925 and, in so doing, also may read from or write to the memory various information processed and or generated pursuant to execution of the instructions.

The processor 920 of the computer system 900 shown in FIG. 9 also may be communicatively coupled to or control the communications interface(s) 905 to transmit or receive various information pursuant to execution of instructions. For example, the communications interface(s) 905 may be coupled to a wired or wireless network, bus, or other communication means and may therefore allow the computer system 900 to transmit information to or receive information from other devices (e.g., other computer systems). One or more communications interfaces may facilitate information flow between the components of the system 900. In some implementations, the communications interface(s) may be configured (e.g., via various hardware components or software components) to provide a website as an access portal to at least some aspects of the computer system 900. Examples of communications interfaces 905 may include user interfaces (e.g., web pages), through which the user can communicate with the computer system 900.

The output devices 910 of the computer system 900 shown in FIG. 9 may be provided, for example, to allow various information to be viewed or otherwise perceived in connection with execution of the instructions. The input device(s) 915 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

The systems and methods as described in the present disclosure may be implementable for any type of third-party content item (i.e., for any type of content item to be displayed on a resource). In one implementation, the content items may include advertisements. In one implementation, the content items may include any text, images, video, stories (e.g., news stories), social media content, links, or any other type of content provided by a third-party for display on the resource of a first-party content provider. The type of content item for which the content visibility methods herein are used for is not limiting.

In some illustrative implementations, the features disclosed herein may be implemented on a smart device (e.g., a smart watch, a smart appliance, a smart television, and/or other smart device), which may include a processing circuit configured to integrate Internet connectivity and/or for performing one or more operations. In alternate implementations, the features may be implemented on a laptop computer or other personal computer, a smartphone, other mobile phone, handheld computer, a tablet PC, or other computing device.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions and/or computer-usable data described herein.

The various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Example System and Process Arrangements

Figure 2:
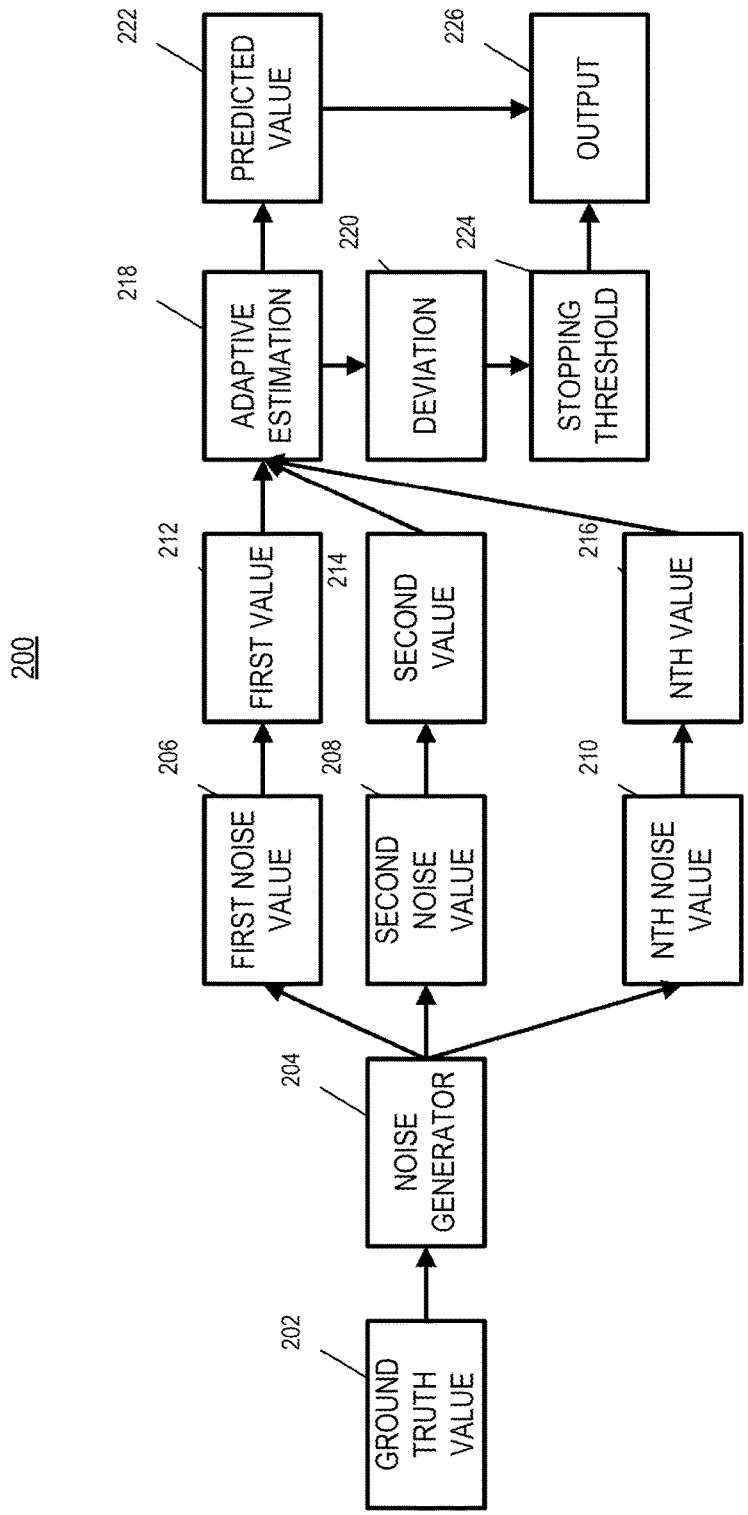
FIG. 2 depicts a block diagram of an example value obfuscation and prediction system according to example embodiments of the present disclosure.

FIG. 2 depicts a block diagram of an example value obfuscation and prediction system 200 according to example embodiments of the present disclosure. In particular, one or more ground truth values 202 may be processed to obfuscate the values while maintaining a target accuracy.

For example, a ground truth value 202 may be obtained in which the ground truth value 202 is associated with interaction data. The ground truth value 202 may include one or more numerical values, one or more vector values, and/or one or more hash values. The ground truth value 202 can be descriptive of interaction data, image data, text data, statistical data, audio data, multimodal data, feature data, and/or embedding data.

The ground truth value 202 may be processed with a noise generator 204 to generate noise. The noise may be randomly selected from a noise range that may be dependent on a selected range, a sampling rate, the magnitude of the ground truth value, and/or one or more other contexts. The noise generator 204 may generate a first noise value 206 during a first instance, a second noise value 208 during a second instance, and an nth noise value 210 for an nth instance. The first noise value 206, the second noise value 208, and the nth noise value 210 may differ and/or may be associated with different noise ranges.

Respective noise-added values can then be generated for each respective noise value via one or more noise adding techniques. For example, a first value 212 may be generated by adding the first noise value 206 to the ground truth value 202, a second value 214 may be generated by adding the second noise value 208 to the ground truth value 202, and an nth value 216 may be generated by adding the nth noise value 210 to the ground truth value 202.

Each of the values may be generated and/or obtained to gather a plurality of instances of noise-added data. The first value 212, the second value 214, and the nth value 216 can then be processed with an adaptive estimation block 218 to determine a deviation 220 for the values and a predicted value 222 based on the values. In some implementations, the deviation 220 may be descriptive of a standard deviation for the group of values. The deviation 220 may be based on an average of the values. The predicted value 222 may be descriptive of an estimate of the ground truth value 202 based on the obtained noise-added values.

The deviation 220 may be processed with a stopping threshold block 224 to determine whether the deviation 220 is associated with a target accuracy. If the threshold is met, the predicted value 222 may be provided as an output 226. If the threshold is not met, one or more additional noise-added values may be obtained and processed to determine an updated predicted value and an updated deviation. The loop may be repeated until the threshold is met.

The predicted value 222 may be provided to a content provider system via a user interface, a data file transmission, and/or via one or more other mediums.

Figure 4:
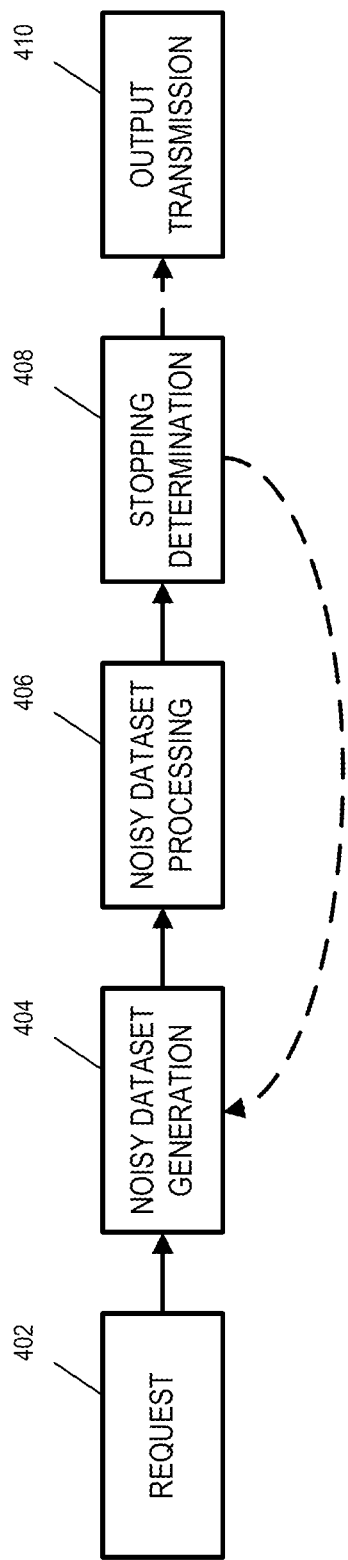
FIG. 4 depicts a block diagram of an example request and output system according to example embodiments of the present disclosure.

FIG. 4 depicts a block diagram of an example request and output system 400 according to example embodiments of the present disclosure. In particular, a request 402 may be obtained from a client computing system (e.g., content provider system). The request 402 may be descriptive of a request for interaction data associated with one or more content items.

The request 402 may be processed to identify the ground truth value that may then be processed with a noisy dataset generation block 404 that may generate a plurality of noisy datasets. The plurality of noisy datasets can then be processed with a noisy dataset processing block 406 to determine a predicted value and a standard deviation for the plurality of noisy datasets. The predicted value may be descriptive of an estimation of the ground truth value based on the noise-added values associated with the noisy datasets.

The standard deviation and/or the predicted value may be processed with a stopping determination block 408 that may determine further noisy datasets are to be generated and processed to generate an updated predicted value and an updated standard deviation. Alternatively and/or additionally, the stopping determination block 408 may determine a threshold accuracy is met, and an output transmission block 410 may generate a report based on the predicted value that can then be transmitted to the client computing system (e.g., content provider system).

Figure 5:
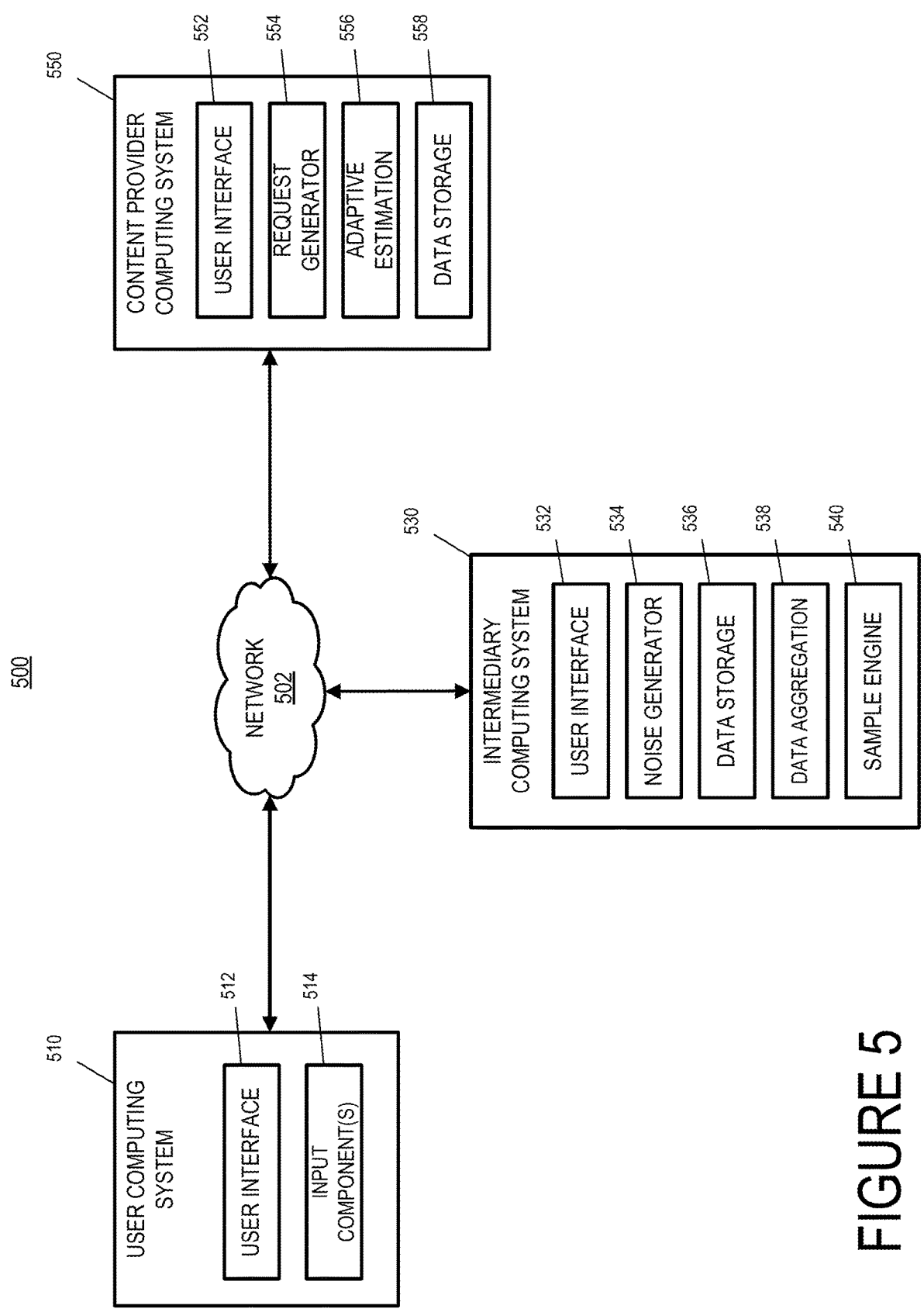
FIG. 5 depicts a block diagram of an example data tracking and serving system according to example embodiments of the present disclosure.

FIG. 5 depicts a block diagram of an example data tracking and serving system 500 according to example embodiments of the present disclosure. The systems and methods disclosed herein may utilize the data tracking and serving system 500 to collect, aggregate, obfuscate, and transmit data. In particular, one or more user computing systems 510, one or more intermediary computing systems 530, and/or one or more content provider computing systems 550 can be communicatively connected via a network 502.

For example, a user computing system 510 may interact with a content item provided by an intermediary computing system 530 via a user interface 512. The user computing system 502 may include one or more input components 514 for selecting, saving, deleting, and/or moving the content item.

The interaction data may be collected and stored by the intermediary computing system 530 via the user interface 532. The interaction data may be stored in data storage 536 and may be aggregated with other interaction data for the content item via a data aggregation block 538. In response to a request from a content provider computing system 550, interaction data may be sampled via a sample engine 540 and/or may be processed with a noise generator 534 to generate one or more noise-added datasets associated with the interaction data.

The content provider computing system 550 may obtain the noise-added dataset via a user interface 552. The request transmitted to the intermediary computing system 530 may be generated with a request generator 554 based on one or more inputs, a trigger event, a time event, and/or one or more other events. The noise-added dataset may be processed with the adaptive estimation block 556 to determine a predicted value and/or determine whether additional noise-added datasets are to be requested. The predicted value may then be stored on data storage 558 and/or may be provided for display in the user interface 552.

Although FIG. 5 depicts the noise generator 534 and the adaptive estimation block 556 being associated with different computing systems, the noise generator 534 and the adaptive estimation block 556 may be stored and/or utilized by the same computing system and may be performed by both systems in parallel.

Example Methods

Figure 3:
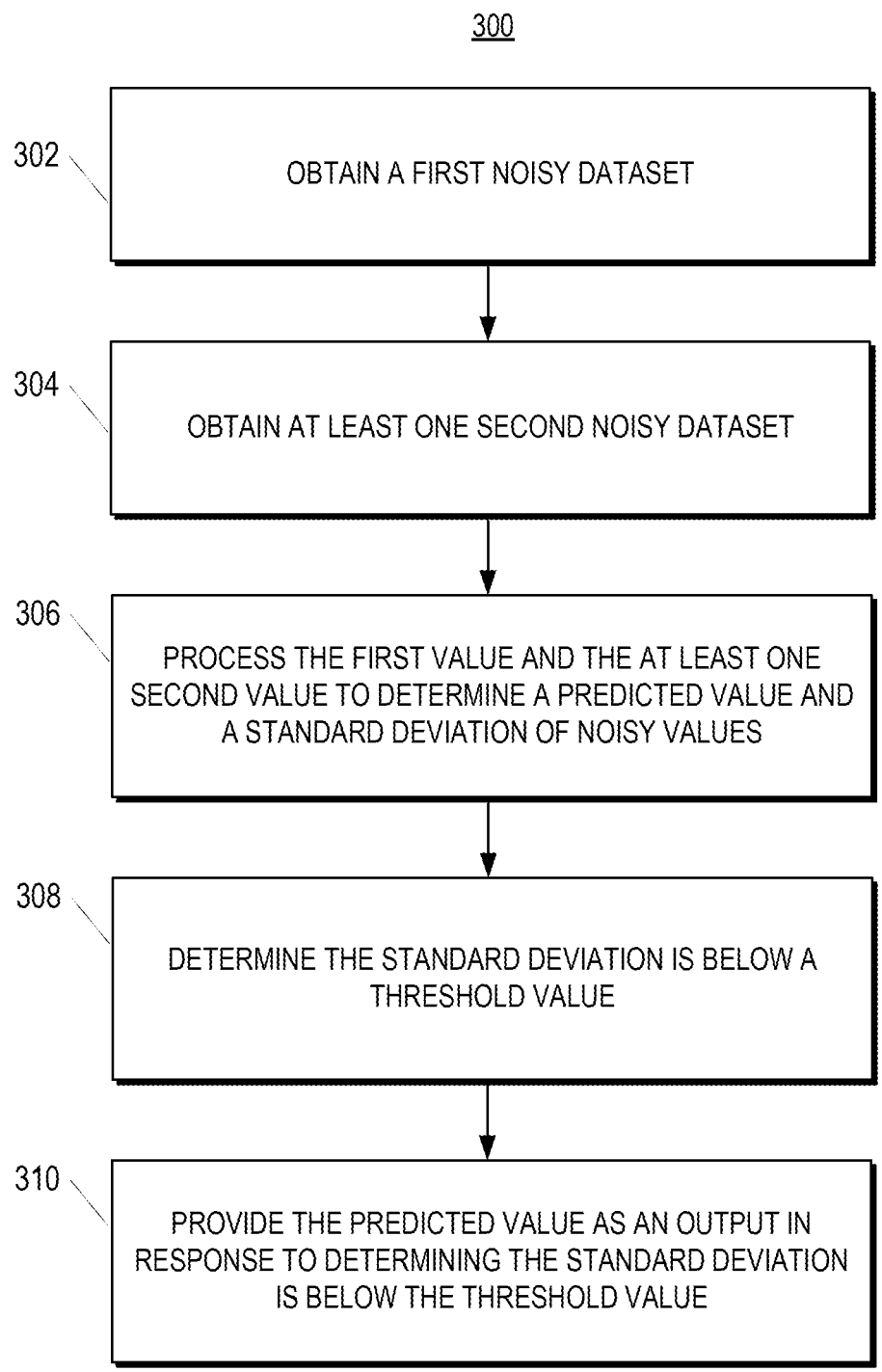
FIG. 3 depicts a flow chart diagram of an example method to perform value prediction according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain a first noisy dataset. The first noisy dataset can be descriptive of a first value. The first value can be generated by adding a first noise value to a ground truth value. In some implementations, the first noise value can include a random number value within a noise range. The ground truth value can be descriptive of an amount of views of a media content item. Alternatively and/or additionally, the ground truth value can be descriptive of an amount of interactions with a user interface element. The interactions may include views, selections, saves, deletions, link navigation, indications of interest, indications of non-interest, and/or other interactions. The first noisy dataset can include a plurality of noise-added values associated with a plurality of ground truth values. The plurality of ground truth values may include and/or be descriptive of metadata associated with the interactions. The ground truth values may be associated with individual numbers, a plurality of numbers, vectors, embedding values, and/or hashes. The ground truth value may be descriptive of statistics, images, text, audio, and/or other data.

At 304, the computing system can obtain at least one second noisy dataset. The at least one second noisy dataset can be descriptive of at least one second value. For each of the at least one second value, a respective second value can be generated by adding a respective second noise value to the ground truth value. In some implementations, the at least one second noisy dataset can include a plurality of second noisy datasets. The at least one second value can include a plurality of second values. Additionally and/or alternatively, the noise range for the random number value of the first noise value may differ from the one or more respective noise ranges for the plurality of respective second noise values. Each of the plurality of second noisy datasets can include a plurality of noise-added values associated with a plurality of ground truth values.

At 306, the computing system can process the first value and the at least one second value to determine a predicted value and a standard deviation of noisy values. The standard deviation can be based on the predicted value, the first value, and the plurality of second values. The predicted value may be determined based on averaging the first value and the at least one second value. In some implementations, the averaging can be a weighted average based on the noise range utilized for determining and adding noise.

At 308, the computing system can determine the standard deviation is below a threshold value. The threshold value can be determined based at least in part on an order of magnitude of the predicted value. The threshold value may be determined based on a stopping coefficient that is associated with a target accuracy range. The computing system may iteratively obtain additional noisy datasets until the deviation reaches the threshold value. In some implementations, the stopping coefficient may be configured such that the obtainment is stopped once the deviation is above a threshold value instead of below.

At 310, the computing system can provide the predicted value as an output in response to determining the standard deviation is below the threshold value. The predicted value may be provided with a plurality of other predicted values associated with a plurality of other ground truth values associated with the first noisy dataset and the at least one second noisy dataset.

In some implementations, the computing system can obtain a value request from a user computing system. The value request can be descriptive of a query to obtain an estimate of the ground truth value. The first noisy dataset can be obtained based on the value request.

Additionally and/or alternatively, the computing system can generate a report for the user computing system. The report can include the predicted value. The report can then be transmitted to the user computing system.

In some implementations, the computing system can vary the noise range for each instance of noise data generation such that the first noise value is randomly selected from a first value range and a plurality of respective second noise values are randomly selected from a plurality of respective second value ranges. The predicted value may be determined based on weighting the first value and the plurality of second values based on respective noise ranges. In some implementations, the weighting can be inversely scaled based on a noise range size.

Figure 6:
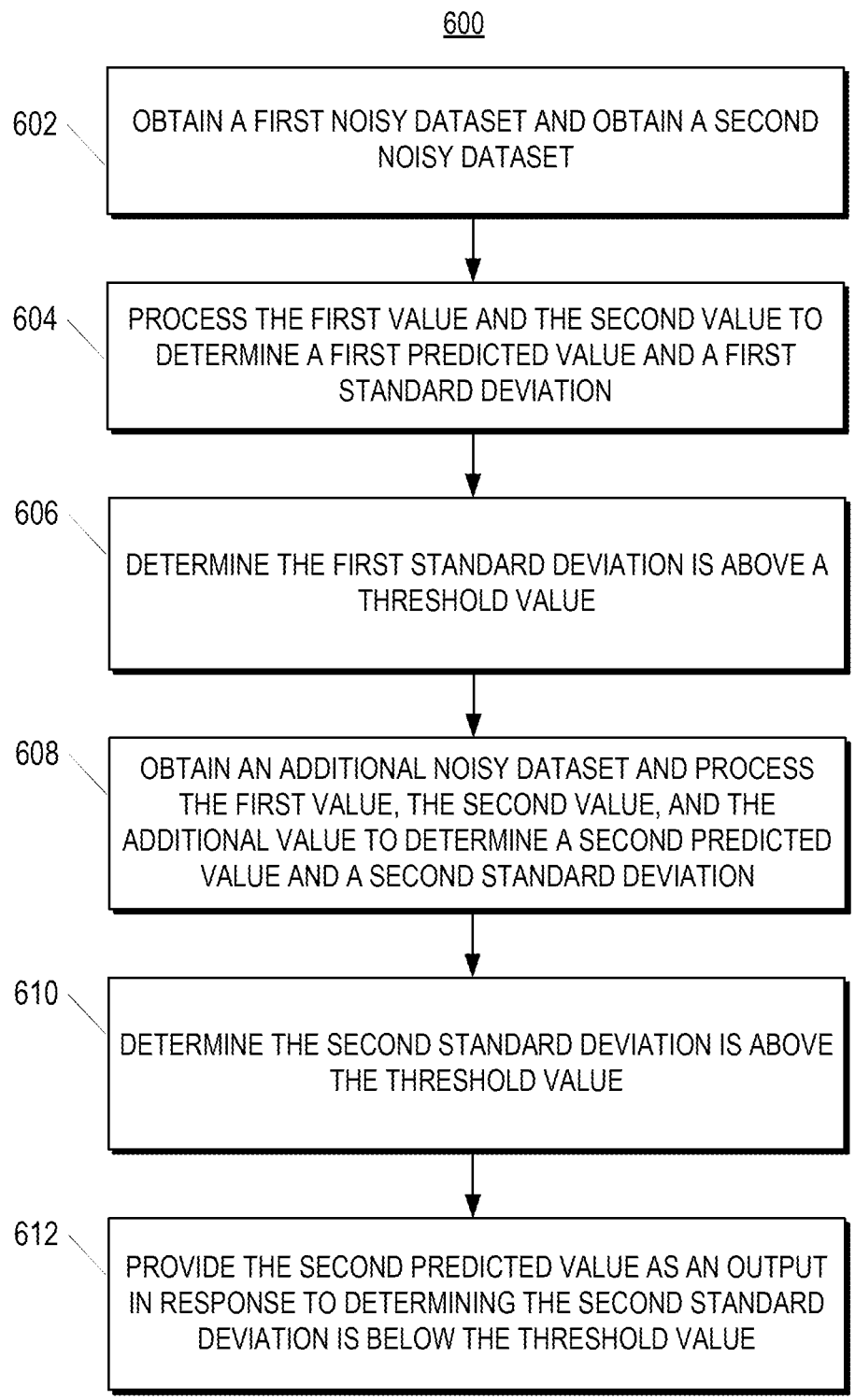
FIG. 6 depicts a flow chart diagram of an example method to perform value prediction and stopping determination according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a first noisy dataset. The first noisy dataset can be descriptive of a first value. The first value can be generated by adding a first noise value to a ground truth value. In some implementations, the first noise value can include a random number value within a noise range. The noise range may be determined based on a Gaussian distribution. In some implementations, the first noise value may obfuscate the ground truth value.

The computing system can obtain a second noisy dataset. The second noisy dataset can be descriptive of a second value. The second value can be generated by adding a respective second noise value to the ground truth value. The first noise value and the second noise value may differ. Additionally and/or alternatively, the noise range for the first noise value and the noise range for the second noise value may be different. The respective noise ranges may be included in the respective noisy datasets.

At 604, the computing system can process the first value and the second value to determine a first predicted value and a first standard deviation. In some implementations, the first standard deviation can be based on the first predicted value, the first value, and the second value. The first predicted value may be determined based at least in part on the respective noise ranges (e.g., via a weighted average).

At 606, the computing system can determine the first standard deviation is above a threshold value. The threshold value can be determined based at least in part on an inverse cumulative distribution function. In some implementations, the inverse cumulative distribution function can be dependent on a requested confidence level.

At 608, the computing system can obtain an additional noisy dataset. The additional noisy dataset can be descriptive of an additional value. The additional value can be generated by adding a respective additional noise value to the ground truth value. The noise range for the additional noise value may differ from the respective noise ranges for the first noise value and the second noise value. Additionally and/or alternatively, the first noise value, the second noise value, and the additional noise value may differ. The additional noisy dataset may be obtained in response to determining the first standard deviation is above the threshold value.

The computing system can process the first value, the second value, and the additional value to determine a second predicted value and a second standard deviation. The second standard deviation can be based on the second predicted value, the first value, the second value, and the additional value. In some implementations, the first noisy dataset can be generated by sampling a population of data. Additionally and/or alternatively, the ground truth value can be descriptive of a count for a first sampled subpopulation. The predicted value can be determined by weighting the first value based on a sampling rate (e.g., based on a corresponding sampling rate for the first subpopulation associated with the first value). The sampling rate can be descriptive of a size for the first sampled subpopulation.

At 610, the computing system can determine the second standard deviation is above the threshold value. The threshold value may differ from the threshold value utilized to evaluate the first standard deviation. Alternatively and/or additionally, the threshold value may be the same. The threshold value may be associated with a target accuracy range.

At 612, the computing system can provide the second predicted value as an output in response to determining the second standard deviation is below the threshold value. The second predicted value may be provided with an indication of a level of accuracy determined based on the one or more determined variances or deviations. In some implementations, the second predicted value may be provided in a graphical user interface and/or a transmitted data file.

Figure 7:
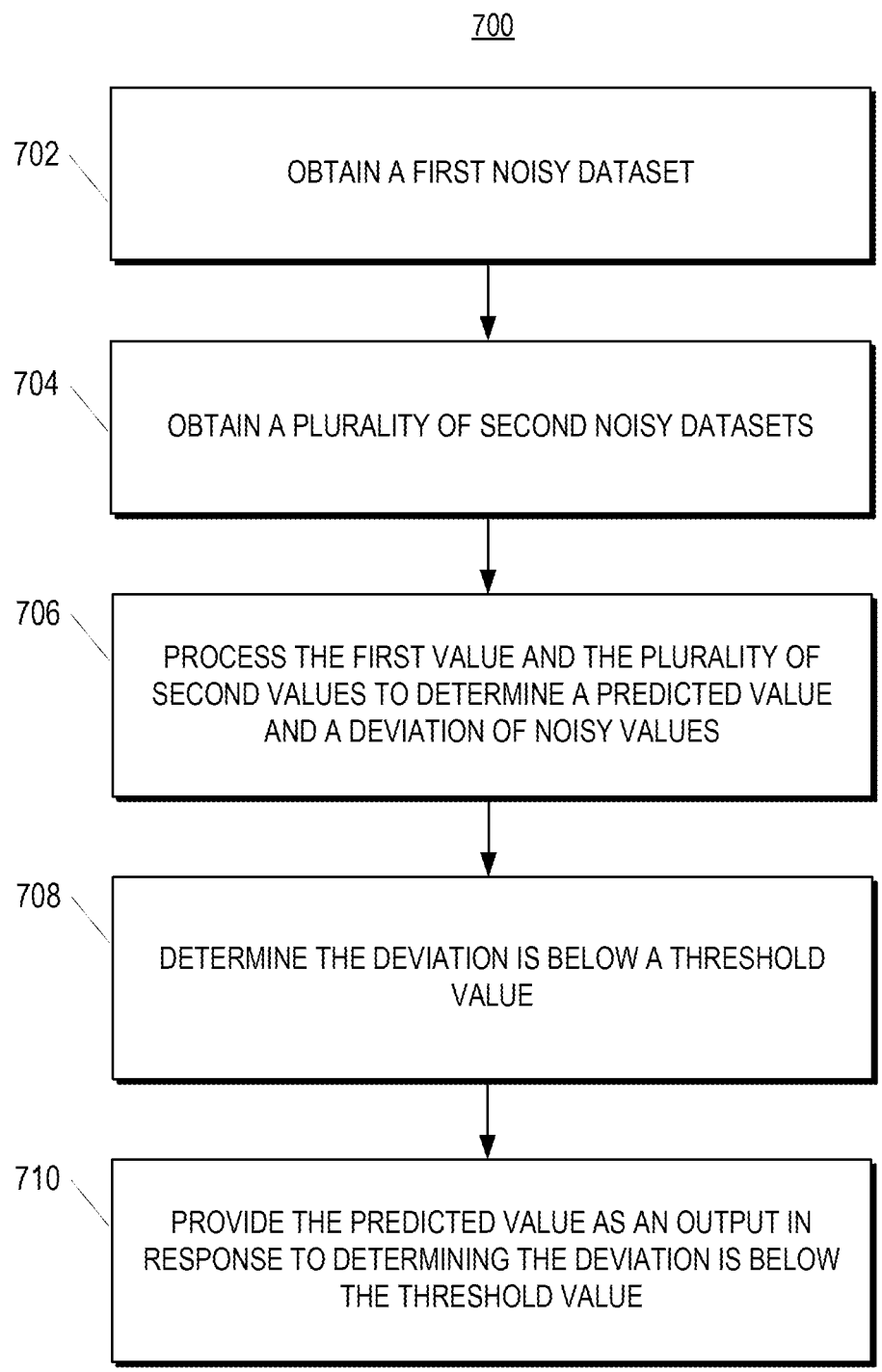
FIG. 7 depicts a flow chart diagram of an example method to perform adaptive privacy budgeting according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a first noisy dataset. The first noisy dataset can be descriptive of a first value and a first noise range. The first value can be generated by adding a first noise value to a ground truth value. In some implementations, the first noise value can include a random number value within the first noise range.

At 704, the computing system can obtain a plurality of second noisy datasets. The plurality of second noisy datasets can be descriptive of a plurality of second values and a plurality of respective second noise ranges. For each of the plurality of second values, a respective second value can be generated by adding a respective second noise value to the ground truth value. In some implementations, the respective second noise value can include a random number value within a respective second noise range of the plurality of respective second noise ranges. The ground truth value can be determined and stored on a server computing system. Additionally and/or alternatively, the first noise value and the plurality of respective second noise values may have been determined and applied by the server computing system. The first noisy dataset and the plurality of second noisy datasets may be obtained from the server computing system.

At 706, the computing system can process the first value and the plurality of second values to determine a predicted value and a deviation of noisy values. The deviation can be based on the predicted value, the first value, and the plurality of second values. In some implementations, a user computing system may determine the predicted value and the standard deviation. The server computing system and the user computing system can be different systems associated with different entities.

At 708, the computing system can determine the deviation is below a threshold value. The threshold value may be dependent on the predicted value, one or more user inputs, the one or more noise ranges, the number of noisy datasets, the type of data, the field of data, and/or one or more other contexts.

At 710, the computing system can provide the predicted value as an output in response to determining the standard deviation is below the threshold value. The predicted value may be determined and provided based on a request, a trigger event, an application programming interface call, and/or one or more other events.

Figure 8:
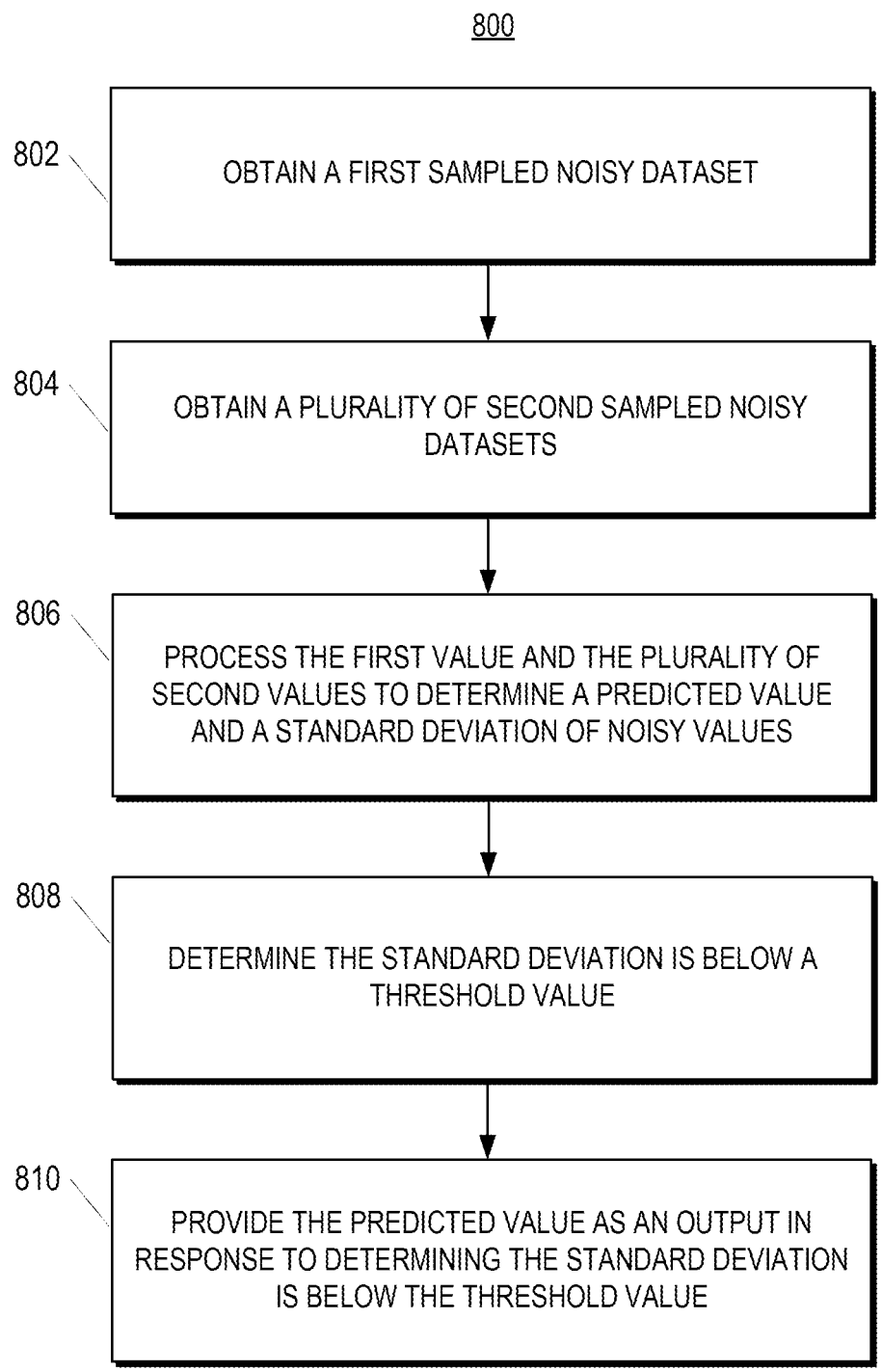
FIG. 8 depicts a flow chart diagram of an example method to perform adaptive sampling according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a first sampled noisy dataset. The first sampled noisy dataset can be descriptive of a first value. The first value can be generated by adding a first noise value to a first ground truth value. In some implementations, the first noise value can include a random number value within a noise range. The first ground truth value can be determined by sampling a first portion of a reach dataset. The reach dataset can be descriptive user views associated with a media content item. Additionally and/or alternatively, the first ground truth value can be determined by sampling at a first sampling rate. The first sampling rate can be associated with a size of a first sampled dataset.

At 804, the computing system can obtain a plurality of second sampled noisy datasets. The plurality of second sampled noisy datasets can be descriptive of a plurality of second values. For each of the plurality of second values, a respective second value can be generated by adding a respective second noise value to a respective second ground truth value. Each of the respective second ground truth values can be determined by sampling a respective second portion of the reach dataset. The respective second ground truth value can be determined by sampling at a second sampling rate. In some implementations, the second sampling rate can be associated with a size of a second sampled dataset. The first sampling rate and the second sampling rate may differ. The noise range can be constant for the first value and the plurality of second values.

At 806, the computing system can process the first value and the plurality of second values to determine a predicted value and a standard deviation of noisy values. The standard deviation can be based on the predicted value, the first value, and the plurality of second values. In some implementations, the predicted value can be determined based on weighting the first value and the plurality of second values based on respective sampling rates for each respective ground truth value.

At 808, the computing system can determine the standard deviation is below a threshold value. The threshold value may be dependent on the predicted value, one or more user inputs, the one or more sampling rates, the number of noisy datasets, the type of data, the field of data, and/or one or more other contexts.

At 810, the computing system can provide the predicted value as an output in response to determining the standard deviation is below the threshold value. The predicted value may be determined and provided based on a request, a trigger event, an application programming interface call, and/or one or more other events.

Example Implementations

Count estimation can be prevalent in tracking interactions in the content provider industry. Use cases can include estimating the number of ads exposures (e.g., impressions and number of unique users exposed to an ad (e.g., reach)). Count estimation may be non-trivial under privacy restrictions.

The systems and methods disclosed herein can aim to estimate counts accurately while having a minimum impact on privacy. The systems and methods can include adaptive privacy budgeting and/or adaptive sampling.

The adaptive privacy budgeting can achieve a target accuracy while consuming the minimum privacy budget, through a multi round adaptive process. The adaptive sampling may include a variation of the adaptive privacy budgeting, in a setting where the system counts a sample instead of the whole population but fixes the noise level added to the count. The adaptive sampling can achieve the target accuracy while using the minimum sample, and thus using the minimum privacy budget.

Adaptive privacy budgeting and adaptive sampling can include overlaps in processes and system configurations and may include differences.

Adaptive privacy budgeting and/or the adaptive sampling may include and/or implement one or more functions including one or more variables to determine one or more predicted values.

For example, adaptive privacy budgeting can include one or more functions for estimating a value descriptive of an unknown count n. The systems and methods can estimate n in multiple rounds. At each round i, the systems and methods can ask a custodian system to release a noised count, explicitly, a random variable that follows $N(n, \sigma_i^2)$ where N stands for Gaussian distribution and $\sigma_i^2$ is a noise variance that is specified by the custodian and/or a user. The algorithm can be designed to (1) specify the appropriate noise variance at each round, (2) decide which round to stop at, and (3) put together the observations at all rounds into a final estimate.

The final estimate can achieve the target accuracy, while consuming the minimum privacy budget. The privacy budget consumption can be a function of the noise levels per round, as will be explained later.

The adaptive sampling can include one or more functions for estimating a value descriptive an unknown count n, and the systems and methods can estimate n in multiple rounds. At each round i, the systems and methods can ask the custodian system to count a sample instead of the whole population, and release a noised count of the sample. Explicitly, the system can release a random variable that follows $B(n, \pi_i)+N(0, \sigma^2)$, where B stands for binomial distribution and $\pi_i$ is a sampling rate. Unlike in adaptive privacy budget, adaptive sampling may not vary $\sigma^2$ per round, instead the system may determine and fix the noise range. Instead, the custodian system may allow users to select the sampling rate $\pi_i$ per round. The algorithm may be designed to (1) specify the appropriate sampling rate at each round, (2) decide which round to stop at, and (3) put together the observations at all rounds into a final estimate.

The final estimate can achieve the target accuracy, while using the minimum sampling rate. The minimum sampling rate can mean the minimum computation resources. Additionally and/or alternatively, the minimum sampling rate can mean the minimum sample size (e.g., the number of users whose privacy is impacted, hence the minimum privacy budget).

The adaptive privacy budgeting may include determining and/or obtaining a target relative standard deviation (rstd) T to attempt to obtain.

The outputs may include a tuple $(\hat{n}, \rho)$, where $\hat{n}$ is an estimate of n, and $\rho$ is the privacy budget consumption as will be explained in the procedure below.

The adaptive privacy budgeting system can initiate:
 i←0. //Iteration index
 ρ←0. //Privacy budget consumption
 $\hat{n}$←None. //Current estimate
 std←None. //Standard deviation of the current estimate
 Conduct the following loop:
 (1) i←i+1.
 (2) $\sigma_i^2$←$f_i(\hat{n}, std, T)$, where $f_i$ are pre-specified functions.
 (3) Observe $X_i$ that follows the Gaussian distribution $n+N(0, \sigma_i^2)$. All $X_i$ are mutually independent.
 (4) $\rho$←$\rho+0.5/\sigma_i^2$. This is because under concentrated differential privacy (Dwork et al., "Concentrated Differential Privacy," Arxiv (Mar. 16, 2016), https://arxiv.org/pdf/1603.01887.pdf.), a Gaussian observation with variance $\sigma_i^2$ consumes privacy budget $0.5/\sigma_i^2$.
 (5) $\hat{n}$←$g_i(X_1, \ldots, X_i; \sigma_1^2, \ldots, \sigma_i^2)$ where $g_i$ are pre-specified functions. Meanwhile, update std as the standard deviation of $\hat{n}$.
 (6) Decide whether to stop the loop and return $(\hat{n}, p)$, based on a criterion $C(\hat{n}, std, T)$.

The adaptive sampling may include determining and/or obtaining a target relative standard deviation (rstd) T and a fixed noise variance $\sigma^2$ used at each round.

The outputs may include a tuple $(\hat{n}, \pi)$, where $\hat{n}$ is an estimate of n, and $\pi$ is the total sampling rate.

The adaptive sampling system can initiate:
 i←0. //Iteration index
 π←0. //The total sampling rate
 $\hat{n}$←None. //Current estimate
 std←None. //Standard deviation of the current estimate
 Conduct the following loop:
 (1) i←i+1.
 (2) $\pi_i$←$f_i(\hat{n}, std, T)$, where $f_i$ are pre-specified functions.
 (3) Observe $X_i$ that follows the distribution $B(n, \pi_i)+N(0, \sigma^2)$. All $X_i$ are mutually independent.
 (4) $\pi$←$\pi+\pi_i$. This is because the sampled buckets of user identifiers are different at each round.
 (5) $\hat{n}$←$g_i(X_1, \ldots, X_i; \pi_1, \ldots, \pi_i)$, where $g_i$ are pre-specified functions. Meanwhile, update std as the standard deviation of $\hat{n}$.
 (6) Decide whether to stop the loop and return $(\hat{n}, \pi)$, based on a criterion $C(\hat{n}, std, T)$.

Additionally and/or alternatively, the systems and methods may perform operations based on: "Parameter selectors" $f_i$, "Combinative estimators" $g_i$, and "Stopping criterion" C. The systems and methods may include functions $f_i$, $g_i$, and C, with the objective to minimize the maximum privacy budget consumption $\rho$ for any ground truth n, which may be subject to the estimate $\hat{n}$ meeting the target accuracy with a certain confidence $\beta$. The estimate may mean that for any ground truth n, when repeating the above procedure, std($\hat{n}$) ≤T·n with probability ≥$\beta$, with respect to the randomness of all $X_i$.

The systems and methods may be utilized "for any ground truth n". For example, the systems and methods may be utilized to predict values of n in the range $[10^4, 3\times10^8]$, where $3\times10^8$ is the rough US population size, and $10^4$ is the minimum ads campaign size of interest. In some implementations, the systems and methods may evaluate the algorithm on the grid $n \in \{10^4, 3\times10^4, 10^5, 3\times10^5, 10^6, 3\times10^6, 10^7, 3\times10^7, 10^8, 3\times10^8\}$.

The ranges of parameters of interest may include checking if std($\hat{n}$)≤T·n with probability ≥$\beta$ only for these n, and the objective may be to minimize the maximum $\rho$ over these n.

The ranges of other parameters of interest may include Target rstd T∈{0.5%, 0.75%, 1%, 2%} and/or Confidence $\beta$=0.99.

The functions $f_i$, $g_i$, and C may be notated with variables notated as:

| Notation | Meaning |
|---|---|
| n | The true count |
| $\hat{n}$ | An estimate of the true count |
| T | Target relative standard deviation, such as 1% |
| $\sigma_i^2$ | The noise variance at round i, for adaptive privacy budget |
| $\pi_i$ | The sampling rate at round i, for adaptive sampling |
| $X_i$ | The released noised count at round i |
| $g_i$ | The function that combines the noised counts up to round i as an estimate of the true count |
| C | The stopping criterion |
| $f_i$ | The function that selects the noise variance at round i in adaptive privacy budget, or the sampling rate at round i in adaptive sampling |

The "combinative estimator" $g_i$ for adaptive privacy budgeting can be designed $g_i$ such that $\hat{n}=g_i(X_1, \ldots, X_i; \sigma_1^2, \ldots, \sigma_i^2)$ is a weighted average of $X_1, \ldots, X_i$ with the minimum variance. Explicitly, let $$g_i(X_1, \ldots, X_i; \sigma_1^2, \ldots, \sigma_i^2) = \sum_{j=1}^{i} w_j X_j$$

where the weights $w_j \geq 0$ and $\sum_{j=1}^{i} w_j = 1$. The combinative estimator may give an unbiased estimate of n, since the mean of each $X_j$ is n. Additionally and/or alternatively, $Var(\hat{n})=\sum_{j=1}^{i} w_j^2 Var(X_j)=\sum_{j=1}^{i} w_j^2 \sigma_j^2$, since $X_j \sim N(n, \sigma_j^2)$. Minimizing the variance subject to $\sum_{j=1}^{i} w_j=1$ can give $$w_j = \sigma_j^{-2} \cdot \sum_{k=1}^{i} \sigma_k^{-2},$$

for $1 \leq j \leq k$. Putting the formulas together, $$\hat{n} = g_i(X_1, \ldots, X_i; \sigma_1^2, \ldots, \sigma_i^2) = \left(\sum_{j=1}^{i} \sigma_j^{-2} X_j\right) \Big/ \left(\sum_{j=1}^{i} \sigma_j^{-2}\right),$$

and the dataset may have a standard deviation $$std = \left(\sum_{j=1}^{i} \sigma_j^{-2}\right)^{-1/2}.$$

The corresponding variance may equal the harmonic mean of the per-round noise variances divided by i.

The "combinative estimator" $g_i$ for adaptive sampling can be designed $g_i$ such that $\hat{n} = g_i(X_1, \ldots, X_i; \pi_1, \ldots, \pi_i)$ is a weighted average of $X_1/\pi_1, \ldots, X_i/\pi_i$ with the minimum variance. The dependence of $g_i$ on the noise variance $\sigma^2$ in each round can be dropped, because $\sigma^2$ in each round may be fixed and identical. Explicitly, let $$\hat{n} = g_i(X_1, \ldots, X_i; \pi_1, \ldots, \pi_i) = \sum_{j=1}^{i} w_j \cdot X_j/\pi_j$$

where the weights $w_j \geq 0$ and $\Sigma_{j=1}^{i} w_j = 1$. The configuration can give an unbiased estimate of n, since the mean of each $X_j/\pi_j$ is n. As a result, $\text{Var}(\hat{n}) = \vec{w}^T \cdot V \cdot \vec{w}$ where $\vec{w} = [w_1 \ w_2 \ \ldots \ w_i]^T$ and V is the i×i covariance matrix of the vector $[X_1/\pi_1, X_2/\pi_2, \ldots X_i/\pi_i]^T$, in which the j-th diagonal entry is $(n\pi_j(1-\pi_j)+\sigma^2)/\pi_j^2$ and all the off-diagonal entries are $-n$. Once the sampling rates and noise variance are fixed, the covariance matrix V may depend on only the ground truth n, and n is unknown but n is around $\hat{n}$. Minimizing the variance subject to $\Sigma_{j=1}^{i} w_j = 1$ can give $$[w_1 \ w_2 \ \ldots \ w_{i-1}]^T = -(A^T \cdot V \cdot A)^{-1} \cdot A^T \cdot V \cdot \vec{a}$$

$$w_i = 1 - \sum_{j=1}^{i-1} w_j$$

where A is a i×(i−1) matrix where the first i−1 rows and all the i−1 columns is an (i−1)×(i−1) identity matrix and the last row is an all −1 vector; $\vec{a}$ is an i×1 vector with 1 at the last entry and 0 at the other entries. Thus the systems and methods may perform the following algorithm to determine the weights.

Algorithm:
(1) $w_j \leftarrow 1/i$ for $1 \leq j \leq i$, $\hat{n}_{prev} \leftarrow +\infty$, and $\Delta = 0.001$.
(2) Calculate $\hat{n} \leftarrow g_i(X_1, \ldots, \hat{X}_i; \pi_1, \ldots, \pi_i)$ for $1 \leq j \leq i$ by using $w_j$ for $1 \leq j \leq i$.
(3) Update $[w_1 \ w_2 \ \ldots \ w_{i-1}]^T = -(A^T \cdot V \cdot A)^{-1} \cdot A^T \cdot V \cdot \vec{a}$, and $w_i = 1 - \Sigma_{j=1}^{i-1} w_j$. In some implementations, update $w_j \leftarrow \text{Var}(X_j/\pi_j)$ for $1 \leq j \leq i$ by using $\hat{n}$.
  (a) If $\hat{n}$ and $\hat{n}_{prev}$ are very close, for example, $|\hat{n}_{prev} - \hat{n}| < 1$, the algorithm terminates.
  (b) Otherwise, $\hat{n}_{prev} \leftarrow \hat{n}$, and go back to Step 2.

The algorithm may only need very few steps to achieve the convergence. After the algorithm terminates, the standard deviation of $\hat{n}$ can be given by $$std = \left(\vec{w}^T \cdot V \cdot \vec{w}\right)^{-1/2},$$

which may include $$std = \left\{\sum_{j=1}^{i} \left[(\hat{n}\pi_j(1-\pi_j) + \sigma^2)/\pi_j^2\right]^{-1}\right\}^{-1/2}.$$

The systems and methods may stop data obtainment and processing when a determined confidence level is met, with confidence level $\beta$, that std is no greater than T·n. The confidence can be formulated as follows. The ground truth n may not be known, but the system may know: n is around the current estimate $\hat{n}$, and the gap between them follows $N(0, std^2)$.

Hence, with confidence,
$n \geq \hat{n} + \varphi^{-1}(1-\beta) \cdot std$,
where $\varphi^{-1}$ indicates the inverse cumulative distribution function (cdf) of the standard normal distribution. Thus, as long as $$std \leq T \cdot [\hat{n} + \varphi^{-1}(1-\beta) \cdot std],$$

The systems and methods can be confident to stop. The above process can give the stopping criterion C.

For i=1, the adaptive privacy budgeting system can include $\sigma_1^2 = f_1(T)$ to be the minimum variance to achieve the target accuracy when $n = n_{max} = 3 \times 10^8$. Explicitly, $f_1(T) = (T \cdot n_{max})^2$.

For any i≥2, the adaptive privacy budgeting system can include $\sigma_i^2 = f_i(\hat{n}, std, T)$ to follow a similar logic to the stopping criterion C. The systems and methods may utilize $\pi_i^2$ such that the system can have $\alpha_i$ confidence that the system will meet the target accuracy after round i, where $\alpha_i$ is a tuning parameter. To solve such a $\sigma_i^2$, the standard deviation after round i may become $$\tilde{std} = \left(\sum_{j=1}^{i} \sigma_j^{-2}\right)^{-1/2} = \left(std^{-2} + \sigma_i^{-2}\right)^{-1/2},$$

since std is the standard deviation after round i−1, i.e., $(\Sigma_{j=1}^{i-1} \sigma_j^{-2})^{-1/2}$. Following the same logic as above, with $\alpha_i$ confidence, $n \geq \hat{n} + \varphi^{-1}(1-\alpha_i) \cdot std$. Hence, to have roughly $\alpha_i$ confidence, the system may meet the target accuracy after round i, let $$\tilde{std} = (std^{-2} + \sigma_i^{-2})^{-1/2} = T \cdot [\hat{n} + \varphi^{-1}(1-\alpha_i) \cdot std], \text{ i.e.,}$$

$$\sigma_i^2 = f_i(\hat{n}, std, T) = \left(\{T \cdot [\hat{n} + \varphi^{-1}(1-\alpha_i) \cdot std]\}^{-2} - std^{-2}\right)^{-1},$$

where $\alpha_i$ is a tuning parameter. The above formula to choose $\sigma_i^2$ may be invalid when $\hat{n} + \varphi^{-1}(1-\alpha_i) \cdot std \leq 0$. In this case, the system may simply choose $\sigma_i^2$ as $(T \cdot n_{min})^2$ where $n_{min} = 10^4$.

To minimize the privacy budget consumption, the systems and methods may tend to choose a small $\alpha_i$. But if $\alpha_i$ is too small, the algorithm may converge too slowly. Through experiments, the system may recommend $\alpha_i = 0.001$ for all $i \geq 2$.

For i=1, the adaptive sampling system can include $\pi_1=f_1(T)$ to be the minimum sampling rate to achieve the target accuracy when $n=n_{max}=3\times10^8$. Explicitly, letting $(n\pi_1(1-\pi_1)+\sigma^2)/\pi_1^2=(T\cdot n_{max})^2$, the system may obtain $$\pi_1 = f_1(T) = \frac{n + \sqrt{n^2 + 4n(nT^2+1)\sigma^2}}{2n(nT^2+1)}.$$

For any $i\geq 2$, the adaptive sampling system can include $\pi_i=f_i(\hat{n},std,T)$ follow a similar logic to the stopping criterion C. The adaptive sampling system can include $\pi_i$ such that the system may have $\alpha_i$ confidence that the system may meet the target accuracy after round i, where $\alpha_i$ is a tuning parameter. To solve such a $\pi_i$, the standard deviation after round i may become $$\tilde{std} = \left(\sum_{j=1}^{i} \text{Var}^{-1}(X_j/\pi_j)\right)^{-1/2} = \left(std^{-2} + \text{Var}^{-1}(X_i/\pi_i)\right)^{-1/2},$$

since std is the standard deviation after round i−1, i.e., $(\Sigma_{j=1}^{i-1} \text{Var}^{-1}(X_j/\pi_j))^{-1/2}$. Following the same logic as above, with $\alpha_i$ confidence, $n\geq\hat{n}+\varphi^{-1}(1-\alpha_i)\cdot\tilde{std}$. Hence, to have roughly $\alpha_i$ confidence, the system may meet the target accuracy after round i, let $$\tilde{std} = \left(std^{-2} + \text{Var}^{-1}(X_i/\pi_i)\right)^{-1/2} = T\cdot\left[\hat{n} + \varphi^{-1}(1-\alpha_i)\cdot std\right].$$

Solving the equation above, the system may obtain the following solution:

$$\pi_i = f_i(\hat{n}, std, T) = \frac{nC + \sqrt{(nC)^2 + 4(nC+1)C\sigma^2}}{2(nC+1)},$$

where $$C = \frac{1}{T^2\cdot[\hat{n} + \varphi^{-1}(1-\alpha_i)\cdot std]^2} - \frac{1}{std^2}.$$

where $\alpha_i$ is a tuning parameter. The above formula to choose $\pi_i$ may be invalid when $\hat{n}+\varphi^{-1}(1-\alpha_i)\cdot std\leq 0$. In this case, the system may choose $\pi_i$ as $\pi_1$ where $n_{min}=10^4$.

To minimize the total sampling rate, the systems and methods may tend to choose a small $\alpha_i$. But if $\alpha_i$ is too small, the algorithm may converge too slowly. Through experiments, the systems and methods may recommend $\alpha_i=0.001$ for all $i\geq 2$.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for value estimation, the method comprising:

obtaining, by a computing system comprising one or more processors, a first noisy dataset from an intermediary computing system, wherein the first noisy dataset is descriptive of a first value, wherein the first value is generated with the intermediary computing system by adding a first noise value to a ground truth value to obfuscate the ground truth value, wherein the first noise value comprises a random number value within a noise range, wherein the ground truth value comprises interaction information associated with a plurality of user computing systems, wherein the intermediary computing system aggregates, obfuscates, and transmits interaction data;

obtaining, by the computing system, at least one second noisy dataset from the intermediary computing system, wherein the at least one second noisy dataset is descriptive of at least one second value, wherein for each of the at least one second value:

a respective second value is generated with the intermediary computing system by adding a respective second noise value to the ground truth value to obfuscate the ground truth value;

processing, by the computing system, the first value and the at least one second value to determine a predicted value and a standard deviation of noise-added values, wherein the standard deviation is based on the predicted value, the first value, and the at least one second value;

determining, by the computing system, whether the standard deviation is below a threshold value, wherein when the standard deviation is above the threshold value an additional noisy dataset is obtained and a second predicted value and a second standard deviation are determined; and in response to determining the standard deviation is below the threshold value, providing, by the computing system, the predicted value as an output via a user interface, wherein the predicted value comprises a value estimation of the ground truth value while maintaining differential privacy.

2. The method of claim 1, wherein the noise range for the random number value of the first noise value differs from the one or more respective noise ranges for the respective at least one second noise value.

3. The method of claim 1, wherein the threshold value is determined based at least in part on an order of magnitude of the predicted value.

4. The method of claim 1, further comprising:
obtaining, by the computing system, a value request from a user computing system, wherein the value request is descriptive of a query to obtain an estimate of the ground truth value, wherein the first noisy dataset is obtained based on the value request.

5. The method of claim 4, further comprising:
generating, by the computing system, a report for the user computing system, wherein the report comprises the predicted value;
transmitting, by the computing system, the report to the user computing system.

6. The method of claim 1, wherein the at least one second noisy dataset comprises a plurality of second noisy datasets, and wherein the at least one second value comprises a plurality of second values.

7. The method of claim 6, further comprising: varying the noise range for each instance of noise data generation such that the first noise value is randomly selected from a first value range and a plurality of respective second noise values randomly selected from a plurality of respective second value ranges, wherein the predicted value is determined based on weighting the first value and the plurality of second values based on respective noise ranges.

8. The method of claim 7, wherein weighting is inversely scaled based on a noise range size.

9. The method of claim 1, wherein the ground truth value is descriptive of an amount of views of a media content item.

10. The method of claim 1, wherein the ground truth value is descriptive of at least one of an amount of interactions with a user interface element, an amount of unique viewers for a content item, an amount of clicks of a link, or an amount of conversions.

11. A computing system, the system comprising:
one or more processors; and
one or more non-transitory computer-readable media that collectively store instructions that, when executed by the one or more processors, cause the computing system to perform operations, the operations comprising:
obtaining a first noisy dataset from an intermediary computing system, wherein the first noisy dataset is descriptive of a first value, wherein the first value is generated with the intermediary computing system by adding a first noise value to a ground truth value to obfuscate the ground truth value, wherein the first noise value comprises a random number value within a noise range, wherein the ground truth value comprises interaction information associated with a plurality of user computing systems, wherein the intermediary computing system aggregates, obfuscates, and transmits interaction data;
obtaining a second noisy dataset from the intermediary computing system, wherein the second noisy dataset is descriptive of a second value, wherein the second value is generated with the intermediary computing system by adding a respective second noise value to the ground truth value to obfuscate the ground truth value;
processing the first value and the second value to determine a first predicted value and a first standard deviation, wherein the first standard deviation is based on the first predicted value, the first value, and the second value;
determining the standard deviation is above a threshold value;
obtaining an additional noisy dataset from the intermediary computing system, wherein the additional noisy dataset is descriptive of an additional value, wherein the additional value is generated with the intermediary computing system by adding a respective additional noise value to the ground truth value to obfuscate the ground truth value;
processing the first value, the second value, and the additional value to determine a second predicted value and a second standard deviation, wherein the second standard deviation is based on the second predicted value, the first value, the second value, and the additional value;
determining the second standard deviation is above the threshold value; and
in response to determining the second standard deviation is below the threshold value, providing the second predicted value as an output via a user interface, wherein the second predicted value comprises a value estimation of the ground truth value while maintaining differential privacy.

12. The system of claim 11, wherein the noise range is determined based on a Gaussian distribution.

13. The system of claim 11, wherein the first noise value obfuscates the ground truth value.

14. The system of claim 11, wherein the first noisy dataset is generated by sampling a population of data, wherein the ground truth value is descriptive of a count for a first sampled subpopulation.

15. The system of claim 14, wherein the predicted value is determined by weighting the first value based on a sampling rate, wherein the sampling rate is descriptive of a size for the first sampled subpopulation.

16. The system of claim 11, wherein the threshold value is determined based at least in part on an inverse cumulative distribution function, wherein the inverse cumulative distribution function is dependent on a requested confidence level.

17. One or more non-transitory computer-readable media that collectively store instructions that, when executed by one or more computing devices, cause the one or more computing devices to perform operations, the operations comprising:
obtaining a first noisy dataset from an intermediary computing system, wherein the first noisy dataset is descriptive of a first value and a first noise range, wherein the first value is generated with the intermediary computing system by adding a first noise value to a ground truth value to obfuscate the ground truth value, wherein the first noise value comprises a random number value within the first noise range, wherein the ground truth value comprises interaction information associated with a plurality of user computing systems, wherein the intermediary computing system aggregates, obfuscates, and transmits interaction data;
obtaining a plurality of second noisy datasets from the intermediary computing system, wherein the plurality of second noisy datasets are descriptive of a plurality of second values and a plurality of respective second noise ranges, wherein for each of the plurality of second values:
a respective second value is generated with the intermediary computing system by adding a respective second noise value to the ground truth value to obfuscate the ground truth value, wherein the respective second noise value comprises a random number value within a respective second noise range of the plurality of respective second noise ranges;

processing the first value and the plurality of second values to determine a predicted value and a standard deviation of noise-added values, wherein the standard deviation is based on the predicted value, the first value, and the plurality of second values;

determining whether the standard deviation is below a threshold value, wherein when the standard deviation is above the threshold value an additional noisy dataset is obtained and a second predicted value and a second standard deviation are determined; and in response to determining the standard deviation is below the threshold value, providing the predicted value as an output via a user interface, wherein the predicted value comprises a value estimation of the ground truth value while maintaining differential privacy.

18. The one or more non-transitory computer-readable media of claim 17, wherein the ground truth value is determined and stored on the intermediary computing system, and wherein the first noise value and the plurality of respective second noise values were determined and applied by the intermediary computing system.

19. The one or more non-transitory computer-readable media of claim 18, wherein the first noisy dataset and the plurality of second noisy datasets are obtained from the intermediary computing system.

20. The one or more non-transitory computer-readable media of claim 18, wherein a content provider computing system determines the predicted value and the standard deviation, and wherein the intermediary computing system and the content provider computing system differ.

* * * * *